United States Patent [19]
Nakanishi et al.

[11] Patent Number: 6,006,803
[45] Date of Patent: Dec. 28, 1999

[54] SPECIAL JOINTING METAL DEVICE FOR ADVANCED FRAMEWORK CONSTRUCTION METHOD, METHOD FOR JOINTING WOODEN MEMBERS USING THE SPECIAL JOINTING METAL DEVICE, AND CUTTING METHOD FOR THE SPECIAL JOINTING METAL DEVICE

[75] Inventors: Teruo Nakanishi; Eiji Furuta, both of Kyoto; Masao Yanagihara, Fusimi-ku, all of Japan

[73] Assignee: Nakanishi Koumuten Co., Ltd., Kyoto, Japan

[21] Appl. No.: 08/890,003

[22] Filed: Jul. 8, 1997

[30] Foreign Application Priority Data

Jul. 10, 1996 [JP] Japan .................................. 8-180641

[51] Int. Cl.$^6$ ........................................................ B27F 7/00
[52] U.S. Cl. ........................... 144/353; 52/564; 144/345; 403/294; 403/405.1
[58] Field of Search ...................................... 144/344, 345, 144/353; 403/292, 294, 298, 404, 405.1, 408.1, 233; 52/564, 570, 656.1

[56] References Cited

U.S. PATENT DOCUMENTS

| | | | |
|---|---|---|---|
| 4,742,856 | 5/1988 | Hehr et al. | 144/353 |
| 5,380,119 | 1/1995 | Hadden | 144/353 |
| 5,738,461 | 4/1998 | Kozyrski et al. | 403/294 |

*Primary Examiner*—W. Donald Bray
*Attorney, Agent, or Firm*—Smith, Gambell & Russell, LLP

[57] ABSTRACT

A special jointing metal device for advanced framework construction method includes a flat plate section having a rectangular shape and cylindrical sections which are provided to the flat plate section in one body along opposite edges of the flat plate section, so that wooden members are jointed to one another by inserting the special jointing metal device into holes each of which is formed in the corresponding wooden member.

4 Claims, 11 Drawing Sheets

PRIOR ART

PRIOR ART

PRIOR ART

SPECIAL JOINTING METAL DEVICE FOR ADVANCED FRAMEWORK CONSTRUCTION METHOD, METHOD FOR JOINTING WOODEN MEMBERS USING THE SPECIAL JOINTING METAL DEVICE, AND CUTTING METHOD FOR THE SPECIAL JOINTING METAL DEVICE

BACKGROUND OF THE INVENTION

The present invention relates to a special jointing metal device for advanced framework construction method, a method for jointing wooden members using the special jointing metal device and a cutting method for the special jointing metal device.

RELATED ARTS

Various construction methods are known as wooden framework construction method. A metal fitting construction method is one of the various construction methods. The metal fitting construction method joints wooden members to one another using a metal device A having a rectangular shape, as is illustrated in FIG. 9. The metal device A includes a flat plate section 60 which has a U-shape cut away section 61, a circular hole 62 and two projection pieces 63 and 64 projected therefrom, and metal members 65 and 66 each having a shape which is illustrated in the figure. Each of the metal members is welded to the corresponding projection piece.

Jointing combined wooden constructions and the like to one another using such metal device A is performed following a procedure which is illustrated in FIGS. 10 through 14. In these figures, an example is illustrated in which a beam is jointed to a column.

At a first stage, projection sections (metal members 65 and 66 and projection pieces 63 and 64) of a metal device A are inserted into holes 81 and 82 to their innermost ends which holes 81 and 82 are previously provided in a column 80, as illustrated in FIG. 10. Thereafter, the metal device A is hammered downwards using a proper tool so that the metal device A is pressed downwards and is positioned (refer to FIG. 11).

At a second stage, a bolt 93 is inserted into a hole 91 which is provided in a beam 90 in which holes 91 and 92 corresponding to the cut away section 61 and the hole 62 of the metal device A, and a cut away section (not illustrated, is formed at an edge section of the beam 90) for inserting the metal device A, are previously provided, as illustrated in FIG. 12. Then, the beam 90 is dropped from the upper position with respect to the metal device A until the bolt 93 engages a base edge of the cut away section 61 (refer to FIG. 13). Thereafter, as illustrated in FIG. 14, an adequate downward pressure is applied to the beam 90 and a bolt 94 is inserted into the hole 62 of the metal device A and the hole 92 of the beam 90. Then, both bolts 93 and 94 which are opposite in vertical direction to one another are fixed using corresponding nuts.

The metal device A is made by joining the metal members 65 and 66 to the projection pieces 63 and 64 of the flat plate section 60 by welding. Therefore, the flat plate section 60 having the projection pieces 63 and 64, and the metal members 65 and 66, should be manufactured separately from one another, and then welded to one another. Consequently, the number of manufacturing processes is increased and the cost is increased to that extent. Further, three cutting tools should be changed, such that a twist drill, a flat drill and a side cutting milling cutter should be changed in this order, for forming the hole for inserting the metal device A, due to a shape of the hole, so that the hole forming operation is complicated.

SUMMARY OF THE INVENTION

The present invention was made in view of the above problems.

It is an object of the present invention to offer a special jointing metal device for advanced framework construction which simplifies manufacturing operations and hole forming operations.

It is another object of the present invention to offer a method for jointing wooden members using the special jointing metal device.

It is a further object of the present invention to offer a cutting method for forming a hole for inserting the special jointing metal device.

A metal device for achieving the above objects is realized by a special jointing metal device for advanced framework construction which device is recited in claims 1 and 2. Hereinafter, advanced framework construction is referred to as AFC. AFC is a construction method which employs a special jointing metal device according to the present invention which device is different from a metal device which is employed in the metal fitting construction method.

A metal device according to claim 1 includes a rectangular flat plate section and cylindrical sections which are provided to the flat plate section in one body along opposite edges of the flat plate section.

The metal device is used to joint wooden members (lumber) to one another which members are constructed on a foundation (groundsill). The metal device joints wooden members by inserting the metal device in a hole formed in wooden members, as well as a combination of a tenon and mortise.

A metal device according to claim 2 includes a rectangular flat plate section, a cylindrical section which is provided to the flat plate section in one body along a first edge of the flat plate section, a U-shape cut away section which is formed by cutting from a second edge among a pair of opposing edges which edges cross the first edge along which the cylindrical section is provided, and a hole which is formed in a lower position with respect to the U-shape cut away section.

The metal device is used not only in a case that one piece of lumber is jointed in a vertical and horizontal direction to another piece of lumber (beam and the like) which lays in a horizontal direction, but also in a case that second piece of lumber is jointed in a vertical and horizontal direction to a lumber (column and the like) which stands in a vertical direction. The metal device is also used to joint wooden members to one another which members are constructed on a foundation, as well as the metal device according to claim 1.

The metal devices according to claims 1 and 2 are simpler in manufacturing in comparison to a conventional metal device which is illustrated in FIG. 9. The metal devices are formed in monoblock by pouring melted metal into a molding box, therefore welding of members is not needed at all so that the manufacturing cost is decreased. Further, a hole for inserting the metal device is sufficient to be a simple shape such that the flat plate section and the cylindrical sections are to be inserted, therefore the hole forming operation becomes easier and faster.

A method for jointing wooden members using the special jointing metal device for AFC according to claim 3 uses the metal device according to claim 1. The method forms a first hole in one of the wooden members in which hole one of the cylindrical sections and about half of the flat plate section which is connected to the cylindrical section are to be inserted, the cylindrical section and the flat plate section being a part of the metal device according to claim 1. The method forms a second hole in another wooden member in which hole the other cylindrical section and the remaining portion of the flat plate section which is connected to the cylindrical section are to be inserted, the cylindrical section and the flat plate section being a part of the metal device according to claim 1. The method butts both wooden members so as to coincident butting openings of the first and second holes to one another, then inserts the metal device in the first and second holes.

A method for jointing wooden members using the special jointing metal device for AFC according to claim 4 uses the metal device according to claim 2. The method forms a first hole in one of the wooden members in which hole the cylindrical section and a partial portion of the flat plate section which is connected to the cylindrical section are to be inserted, the cylindrical section and the flat plate section being a part of the metal device according to claim 2. The method forms a second hole in another wooden member in which hole the remaining portion of the flat plate section is to be inserted. The method inserts the cylindrical section and the partial portion of the flat plate section of the metal device in the first hole of one of the wooden members, and inserts the remaining portion of the flat plate section which projects from the one of the wooden members in the second hole of the other wooden member so that both wooden members are butted against one another. The method engages a first rod member with the U-shape cut away section which rod member is previously provided at a corresponding portion of another wooden member. Then, the method inserts a second rod member into the through hole of another wooden member and the hole of the metal device which through hole is previously formed in a corresponding portion of another wooden member.

As is described in the foregoing, the metal device according to the present invention is simple in its arrangement in comparison to the conventional metal device which is illustrated in FIG. 9. Therefore, shapes of the first and second holes formed in the wooden members are simple in comparison to the shapes of holes formed in wooden members which shapes are required for a conventional metal device. That is, it is sufficient that a cylindrical hole for inserting the cylindrical section and a rectangular hole for inserting the flat plate section are formed. It is not required that a hole having a complicated shape similar to conventional holes is to be formed. Therefore, an operation for forming a hole becomes easy. As a result, a jointing operation is performed rapidly and easily by the jointing method according to claims 3 and 4 with respect to a jointing operation using a conventional metal device.

A cutting method for special jointing metal device for AFC according to claim 5 is a cutting method which forms a first hole for inserting the cylindrical section of the metal device according to claim 1 or claim 2 and a second hole for inserting the partial portion of the flat plate section which is connected to the cylindrical section, in a wooden member in one cutting operation. The method uses a drill which includes a first cutter and a second cutter. The first cutter has a cylindrical rod shape and has cutting blades elongating in a longitudinal direction. The second cutter is provided at a leading edge section of the first cutter in one body, and has a sphere shape and cutting blades elongating in radial directions. The cutting method contacts the rotating drill to one face of a wooden member from a side direction so as to position the sphere shaped second cutter at a predetermined depth position. Then, the cutting method moves the rotating drill in a thickness direction of the wooden member to a depth which is sufficient to hide the cylindrical section and the partial portion of the flat plate section of the metal device.

When this cutting method is employed, the hole is formed by one cutting operation in which hole the cylindrical section and the partial portion of the flat plate section of the metal device are inserted, which flat plate section is connected to the cylindrical section. Therefore, simplification and time savings in the hole forming operation is realized.

PREFERRED EMBODIMENTS OF THE INVENTION

Hereinafter, we explain the present invention based upon the following embodiments.

Figure 1:
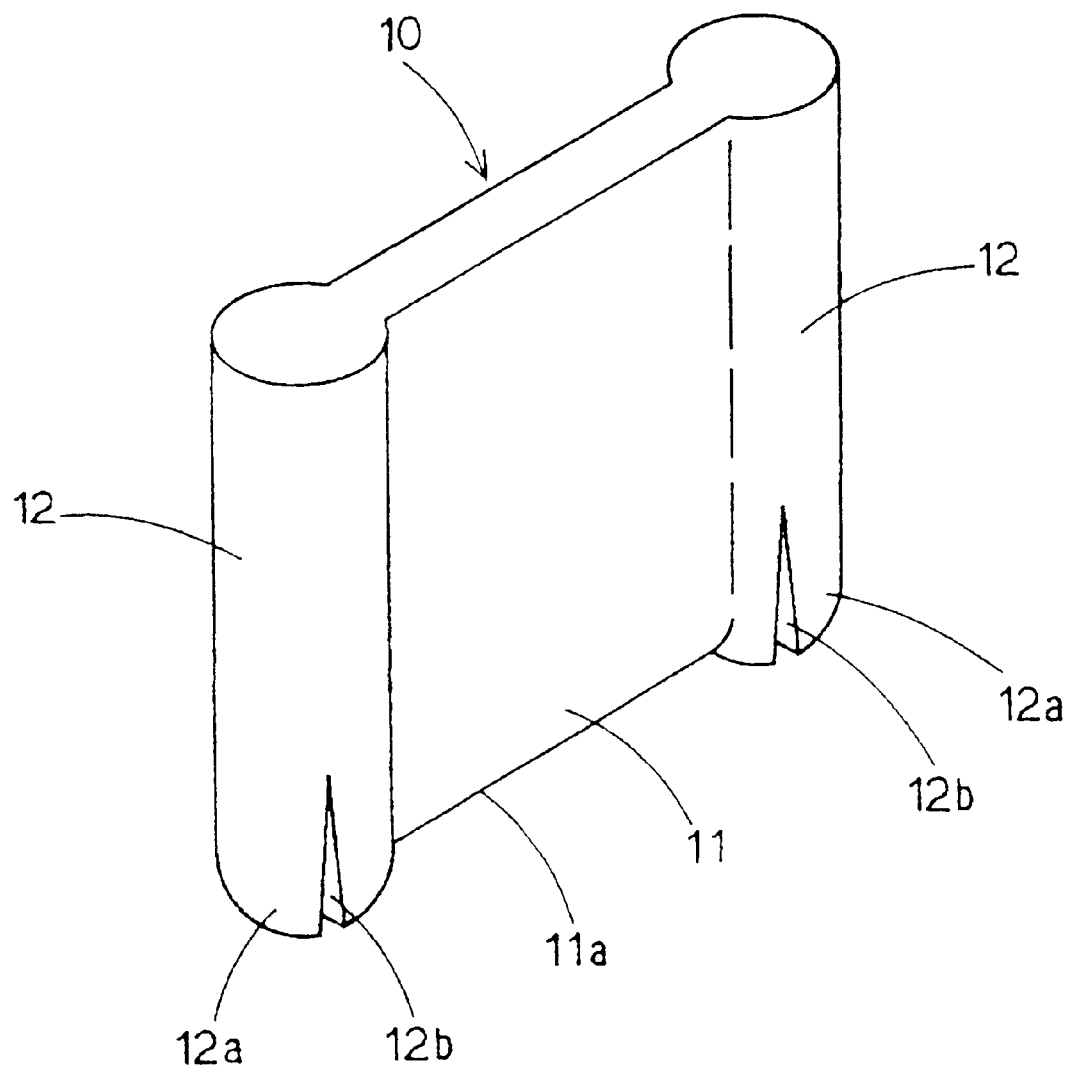
FIG. 1 is a perspective view of a metal device according to claim 1.

FIG. 1 illustrates a perspective view of a special jointing metal device for the AFC according to claim 1. The metal device 10 has a flat plate section 11 having a rectangular shape and cylindrical sections 12 each of which is provided in one body along opposing edges of the flat plate section 11. A bottom edge section 12a of the cylindrical section 12 has a hemisphere shape and has a cut away section 12b in which a wedge is to be inserted, the wedge having a circular cone shape. A bottom edge 11a of the flat plate section 11 has a rounded shape instead of an angular shape.

Figure 2:
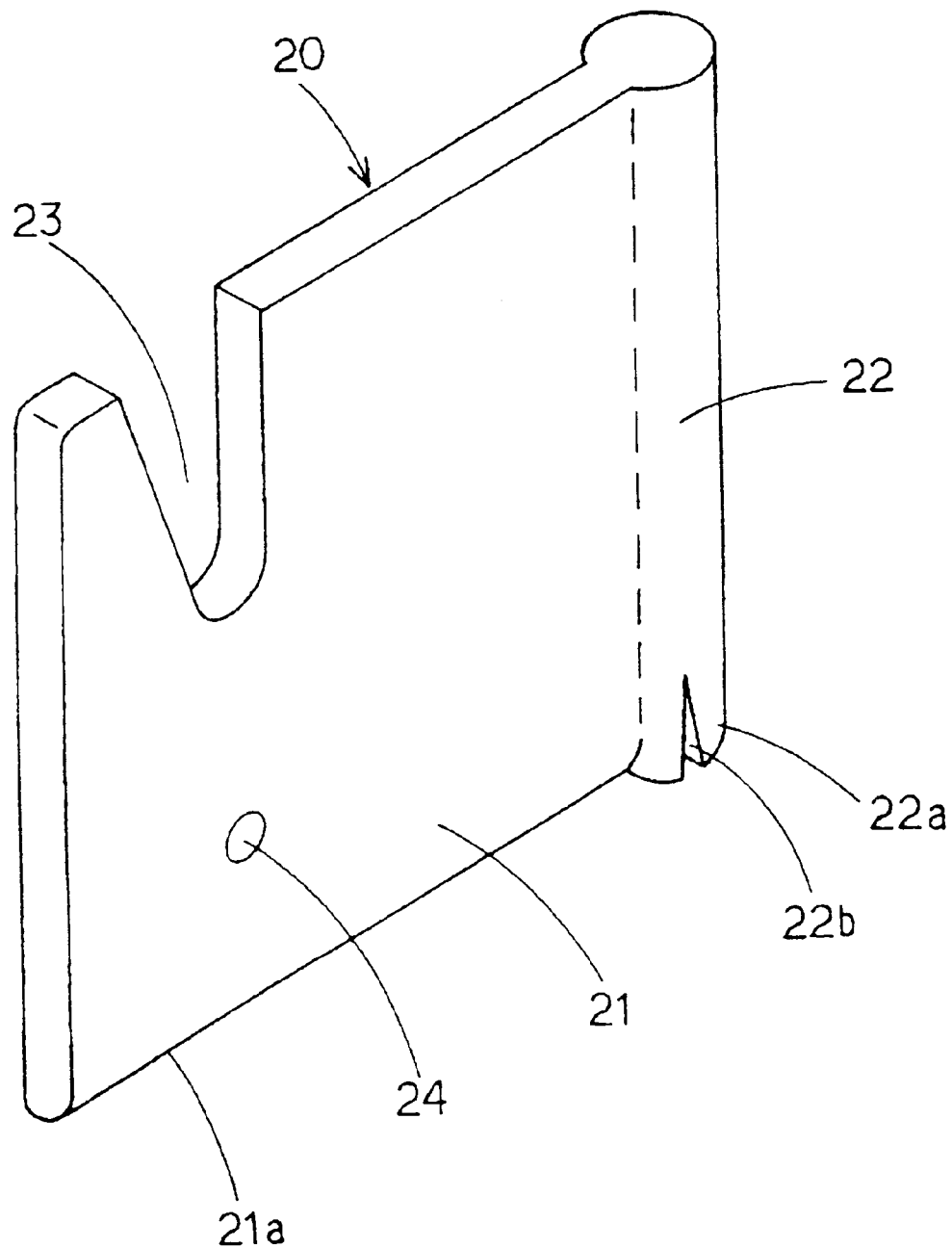
FIG. 2 is a perspective view of a metal device according to claim 2.
Figure 3:
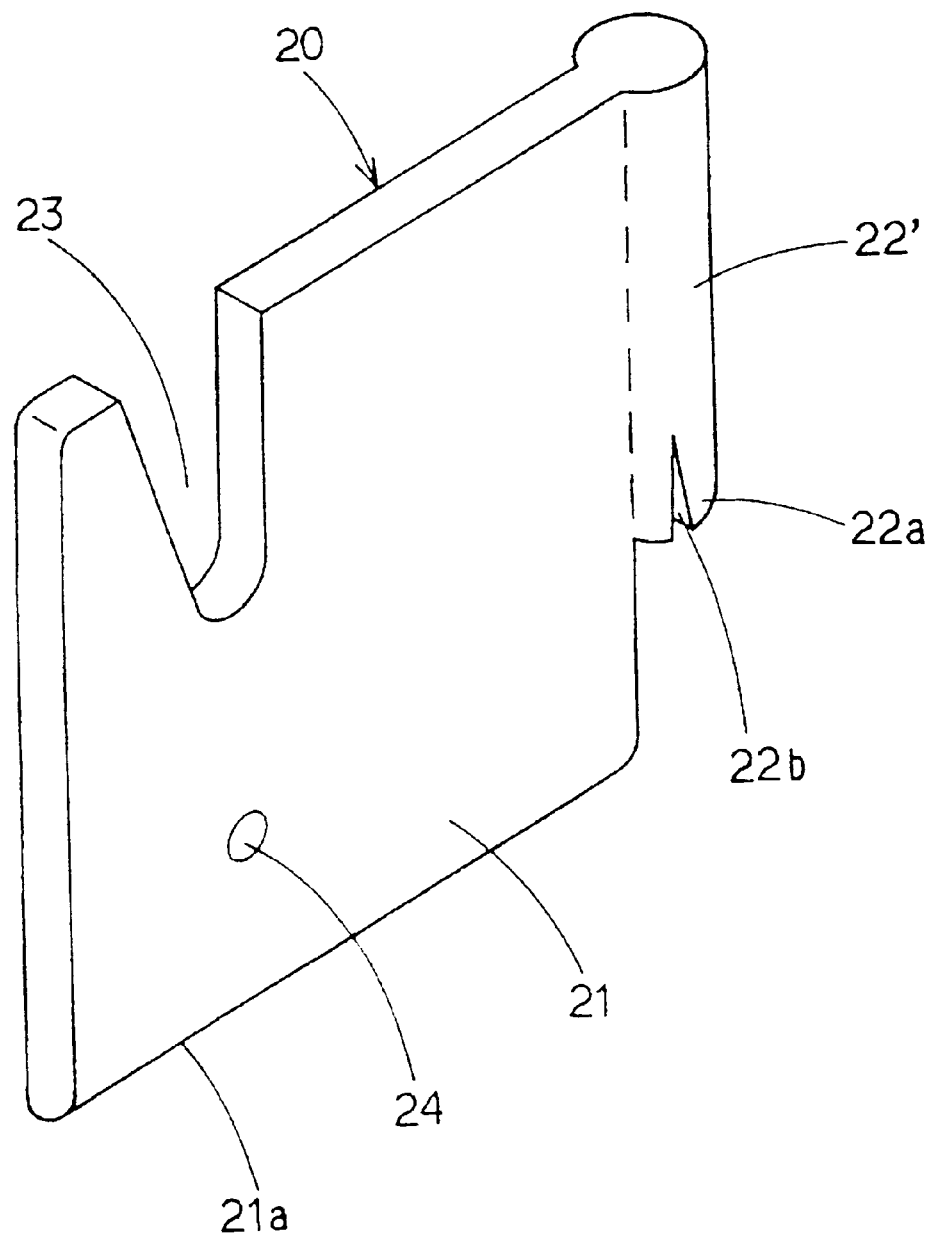
FIG. 3 is a perspective view of a modified sample of a metal device according to claim 2.
Figure 9:
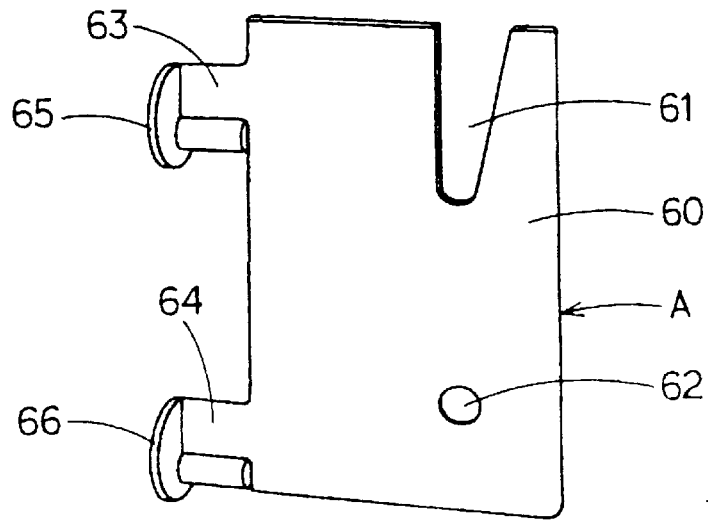
FIG. 9 is a perspective view of an ordinary metal device which is used in a metal fitting construction method.
Figure 10:
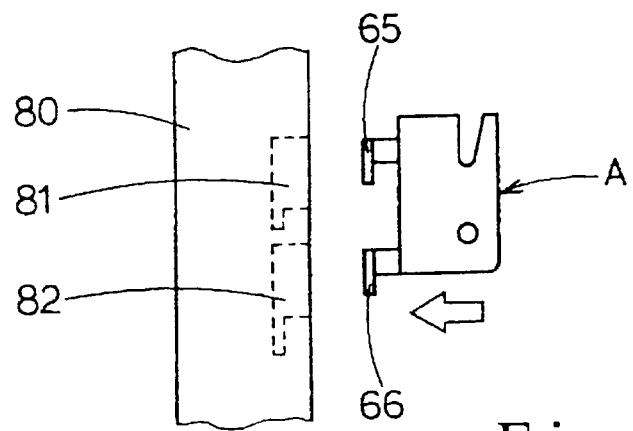
FIG. 10 is a diagram useful in understanding a method for jointing wooden members using the metal device illustrated in FIG. 9.
Figure 11:
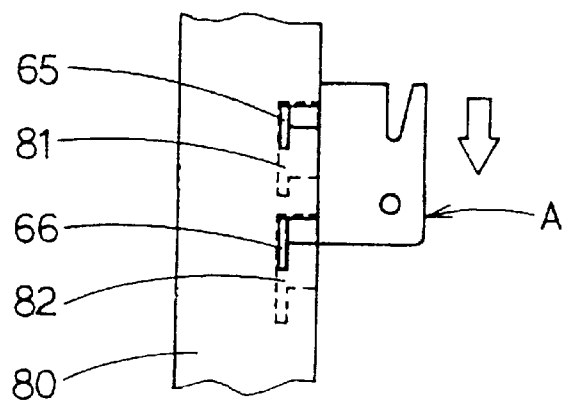
FIG. 11 is a diagram useful in understanding the method for jointing wooden members, the diagram follows FIG. 10.
Figure 12:
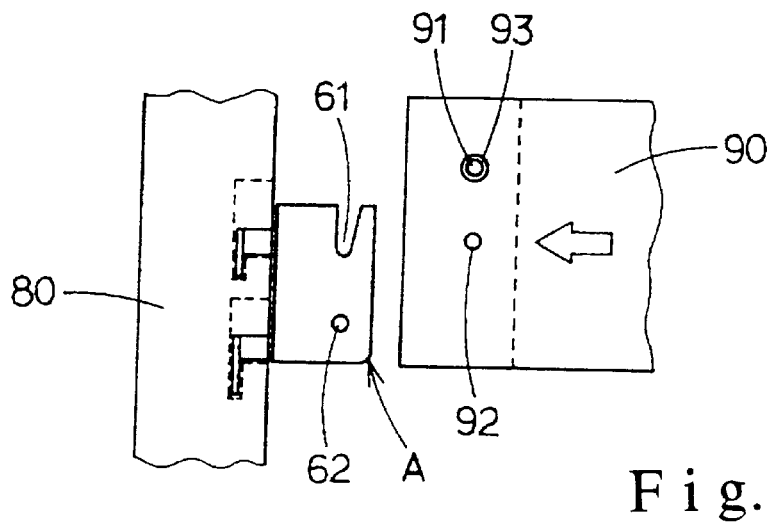
FIG. 12 is a diagram useful in understanding the method for jointing wooden members, the diagram follows FIG. 11.
Figure 13:
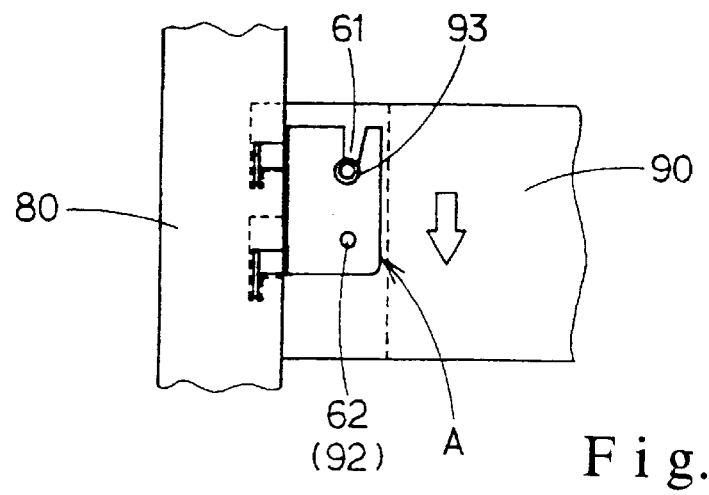
FIG. 13 is a diagram useful in understanding the method for jointing wooden members, the diagram follows FIG. 12.
Figure 14:
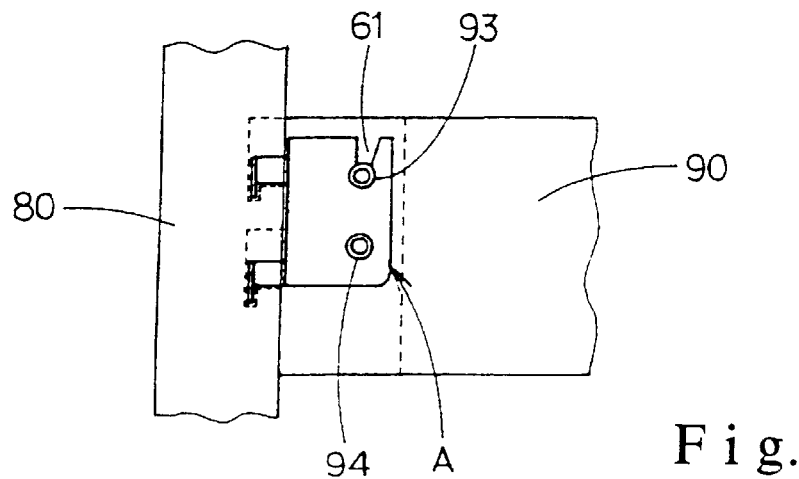
FIG. 14 is a diagram useful in understanding the method for jointing wooden members, the diagram follows FIG. 13.

FIG. 2 illustrates a special jointing metal device for the AFC according to claim 2. The metal device 20 has a flat plate section 21 having a rectangular shape, a cylindrical section 22 which is provided in one body along a first edge of the flat plate section 21, a U-shape cut away section 23 which is formed by cutting away from one of the edges which cross the first edge at which the cylindrical section 22 is provided, and a circular hole 24 which is formed at a lower position with respect to the U-shape cut away section 23. A bottom edge section 22a of the cylindrical section 22 has a hemisphere shape and has a cut away section 22b in which a wedge (which is described later) is inserted. A bottom edge section 21a of the flat plate section 21 has a rounded shape instead of an angular shape. As is apparent from FIG. 2, the metal device 20 has the flat plate section 21 which has the same shape as the shape of the flat plate section 60 of the conventional metal device A illustrated in FIG. 9. The metal device 20 differs from the metal device in FIG. 9 in that the metal device 20 has the cylindrical section 22 instead of the projection pieces 63 and 64 and the metal members 65 and 66. Further, FIG. 3 illustrates the metal device 20 of a modified example. The metal device 20 differs from the metal device illustrated in FIG. 2 in that a length of a cylindrical section 22' is shortened with respect to the cylindrical section 22.

The metal devices 10 and 20 are very simple in their arrangements. The metal devices 10 and 20 are manufactured in monoblock by forming the metal devices by pouring melted metal into a molding box. Especially, when the metal device 20 is manufactured, a cost of the metal device 20 is reduced in comparison to the conventional metal device A.

Figure 4:
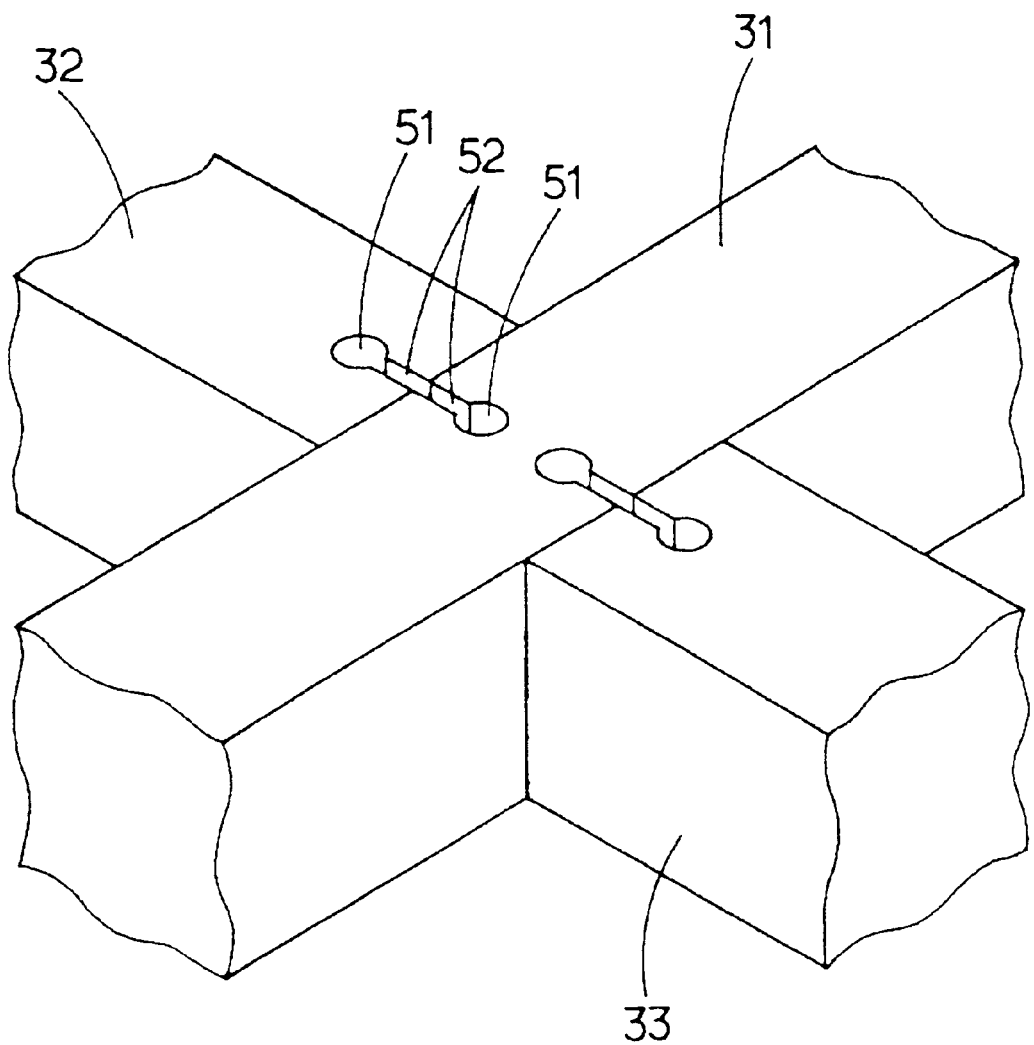
FIG. 4 is a partial perspective view useful in understanding a method for jointing wooden members using the metal device illustrated in FIG. 1.
Figure 6:
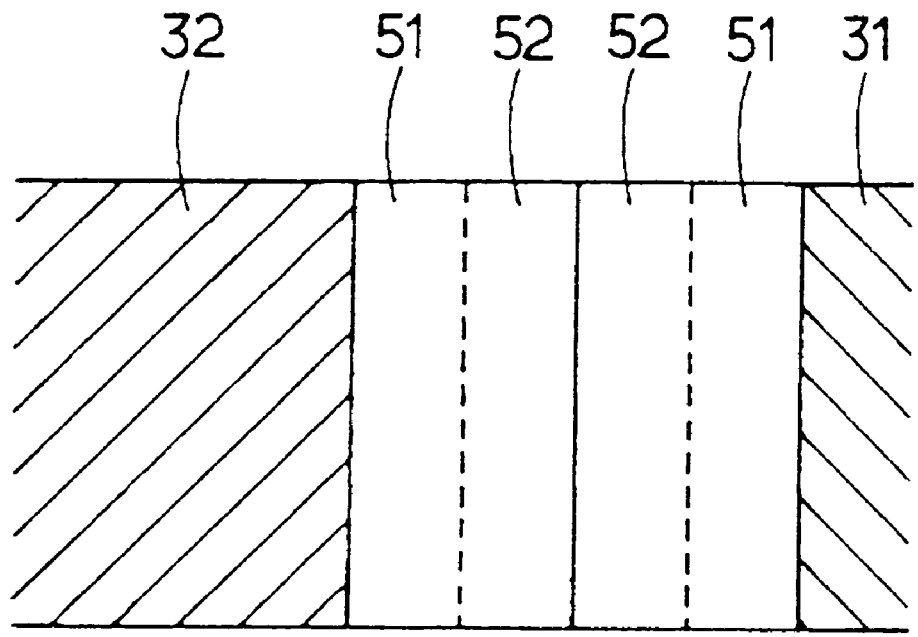
FIG. 6 is a cross sectional view useful in understanding shapes of holes of wooden members illustrated in FIG. 4.

Now, a usage of the metal device 10 is described. In FIG. 4, when a second lumber (wooden member) 32 is jointed in a horizontal direction to a first lumber 31 at its central portion which first lumber is constructed in a horizontal direction on a foundation (base, not illustrated) of a superstructure (house and the like), first holes 51 having a cylindrical shape and second holes 52 having a rectangular shape are formed at a side section of the lumber 31 and an edge section of the lumber 32, respectively. Cross sectional shapes of the first hole 51 and the second hole 52 are illustrated in FIG. 6. The holes 51 and 52 are through holes of the lumbers 31 and 32 in their up and down directions. The first hole 51 corresponds to the cylindrical section 12 of the metal device 10, while the second hole 52 corresponds to a half portion of the flat plate section 11 of the metal device 10. Of course, the first holes 51 and the second holes 52 communicate with one another. The second holes 52 communicate with one another under a condition that the lumbers 31 and 32 butt each other. Under a condition illustrated in FIG. 4, the metal device 10 is forcibly inserted using a proper tool so as to joint the lumber 32 to the lumber 31. Jointing the lumbers 31 and 33 is realized by performing an operation which is quite similar to the above operation.

Figure 5:
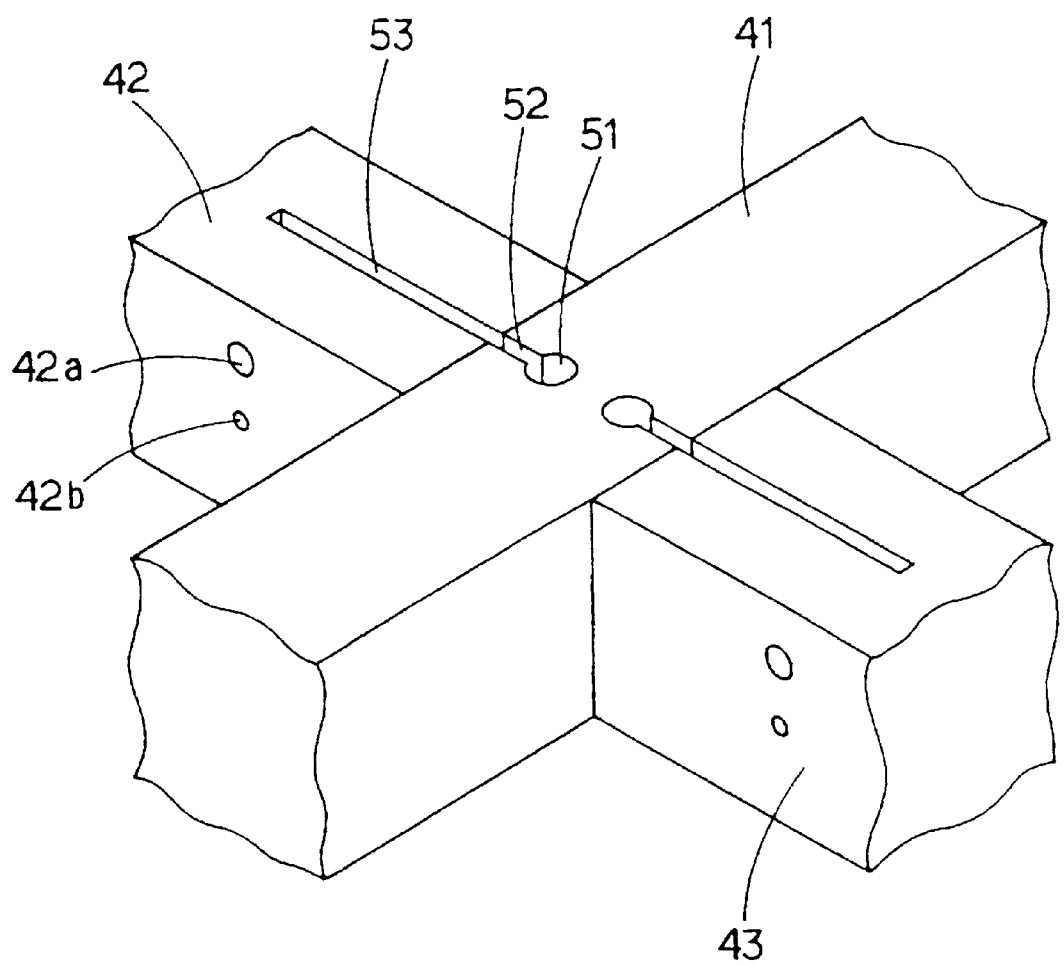
FIG. 5 is a partial perspective view useful in understanding a method for jointing wooden members using the metal device illustrated in FIG. 2 or FIG. 3.

A usage of the metal device 20 is illustrated in FIG. 5. FIG. 5 illustrates a case for jointing a second lumber 42 in a horizontal direction to a first lumber 41 at its central portion which first lumber is fixed in a horizontal direction on a base. In the first lumber 41, a first hole 51 having a cylindrical shape and a second hole 52 having a rectangular shape are formed. The cylindrical section 22 of the metal device 20 is inserted in the first hole 51, while a partial portion of the flat plate section 21 which is connected to the cylindrical section 22 is inserted in the second hole 52. In the second lumber 42, a third hole 53 having a rectangular shape is formed. The remaining portion of the flat plate section 21 is inserted in the third hole 53.

Figure 7:
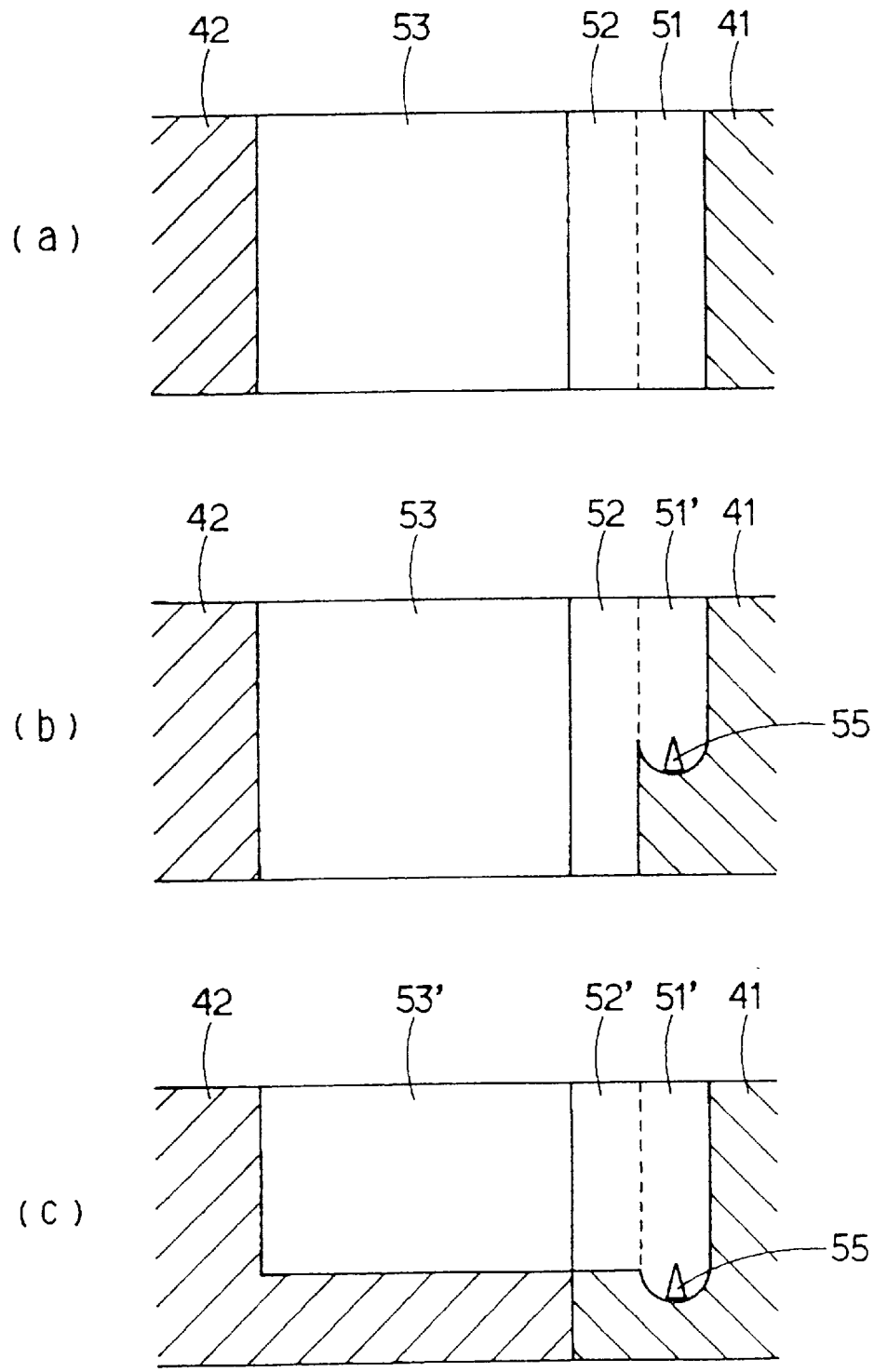
FIGS. 7(a) through 7(c) are cross sectional views useful in understanding various shapes of holes of wooden members illustrated in FIG. 5.

Cross sectional shapes of the holes 51, 52 and 53 are illustrated in FIG. 7(a). That is, when the holes 51 and 52 are through holes of the lumber 41 in up and down directions, the metal device 20 is supported by the base so as to prevent slipping down of the metal device 20 from the lumber 41 because the lumber 41 is supported on the base. Also, the third hole 53 is a through hole of the lumber 42 in the up and down direction. Even when the third hole 53 is a through hole of the lumber 42, the metal device 20 is prevented from slipping down from the lumber 42 because the flat plate section 21 of the metal device 20 which section is inserted into the third hole 53 is fixed to the lumber 42 by rod members (D-pin, bolt and the like) which pass through holes 42a and 42b formed at edge sections of the lumber 42. Further, the metal device is prevented from slipping down from the lumber 42 even when the third hole 53 is a through hole of the lumber, because the lumber 42 is supported on the base.

A jointing operation using the metal device 20 is performed similar to the jointing operation using a conventional metal device A. That is, the cylindrical section 22 and the partial portion of the flat plate section 21 of the metal device 20 is forcibly inserted into the holes 51 and 52 of the lumber 41. Thereafter, the lumber 42 is pressed downward so as to insert the projection portion into the third hole 53 which projection portion is a partial portion of the flat plate section 21 of the metal device 20 from the lumber 41. Then, a D-pin (not illustrated) previously inserted in the through hole 42a of the lumber 42 engages a base edge section of the U-shape cut away section 23 of the metal device 20, so that the lumber 42 is fixed to the lumber 41 by the metal device 20 and the D-pin. After that, another D-pin is inserted in the through hole 42b of the lumber 42 and a through hole 24 of the metal device 20, so that a jointing operation of the lumber 41 and the lumber 42 is finished.

The above operation uses the metal device 20 for jointing lumbers to one another which are supported on the base. When lumbers supported on a base are jointed to one another, it is better that the metal device 10 illustrated in FIG. 1 is used by taking the cost and the like into consideration, but the metal device 20 may be used.

The metal device 20 is intended to be used essentially and mainly in cases (1) and (2). The case (1) is a case that a second lumber is jointed in vertical and horizontal direction to a first lumber (beam and the like) which lays in a horizontal direction. The case (2) is a case that a second lumber is jointed in vertical and horizontal direction to an upper edge section of a first lumber (column and the like) which stands in a vertical direction. A jointing configuration of the case (1) becomes a jointing configuration which is similar to that illustrated in FIG. 5. But, if the holes 51 and 52 are through holes of the lumber 41 in up and down direction, then the metal device 20 slips down from the lumber 41. Therefore, the shapes of holes 51 and 52 are formed to be shapes illustrated in FIG. 7(b) or FIG. 7(c).

The shapes of holes 51' and 52 illustrated in FIG. 7(b) are employed for inserting the metal device 20 illustrated in FIG. 3. The hole 51' is formed down to a central predetermined position in the lumber 41 to suit to the cylindrical section 22' which has a shorter length. The cylindrical section 22' is supported by the lumber 41 so as to make it difficult for the metal device 20 to slip out of the lumber 41, by employing the above shapes of holes 51 and 52. Actually, a metal wedge 55 having a cylindrical cone shape is previously housed in the first hole 51', so that the metal wedge 55 engages the cut away section 22b and forcibly expands a bottom edge section 22a of the cylindrical section 22'.

Therefore, the bottom edge section 22a of the cylindrical section 22 expands outward so as to engage the lumber 41, so that the metal device 20 is securely prevented from slipping out from the lumber 41.

In the shapes of holes 51', 52' and 53' illustrated in FIG. 7(c), every hole 51', 52' and 53' is formed down to central predetermined positions in the lumbers 41 and 42. In this case, either metal device 10 illustrated in FIG. 2 or metal device 20 illustrated in FIG. 3 may be used. When the metal device 20 illustrated in FIG. 3 is employed, the cylindrical section 22' does not reach a bottom section of the first hole 51', but the cylindrical sections 22 and 22' and a partial portion of the flat plate section 21' are supported by the lumber 41. Of course, the metal device 20 having a size which suits for perfectly inserting the metal device 20 in the holes 51', 52' and 53', and the metal wedge 55 having a cylindrical cone shape is housed in the first hole 51', similarly to the above arrangement.

When the case (2) is employed, a cubic section of the lumber 41 including the holes 51 and 52 is supposed to be an uppermost section of a column, so that jointing of lumbers to one another is achieved similarly to the above jointing.

Figure 8:
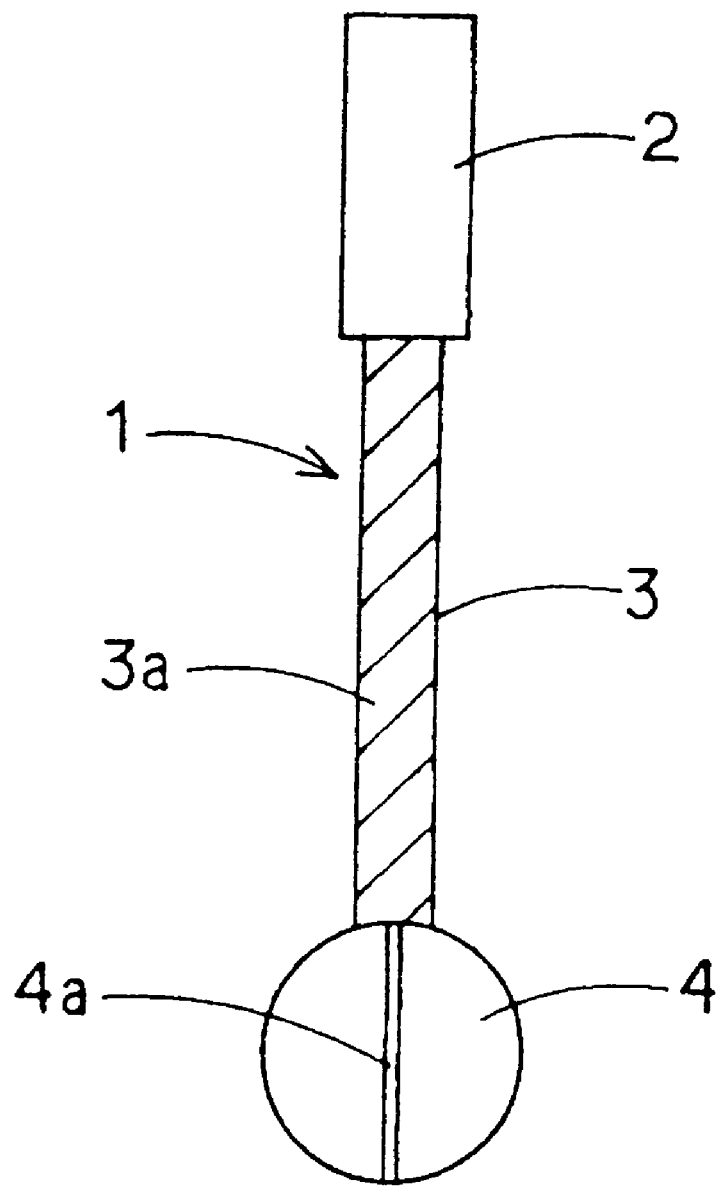
FIG. 8 is a diagram illustrating a drill which is used in a cutting method according to claim 5.

As to the forming of holes for inserting the metal device 10 or metal device 20 (especially, the cylindrical section 12 or 22 and the partial portion of the flat plate section 11 or 21 which is continuous to the cylindrical section 21 or 22), the hole 51 corresponding to the cylindrical section 12 or 22 and the hole 52 corresponding to the partial portion of the flat plate section 11 or 21 may be formed separately from one another. But, when a cutting method according to the present invention is used, the holes 51 and 52 are simultaneously formed, so that the hole forming operation becomes very easy. The cutting method employs a drill 1 illustrated in FIG. 8. The drill 1 illustrated in FIG. 8 includes a shank 2, a first cutter 3 having a cylindrical rod shape and a second cutter 4 having a sphere shape. The first cutter 3 has cutting blades 3a which are elongated in a longitudinal direction. The second cutter 4 has cutting blades 4a which are elongated in radial directions. The second cutter 4 is provided at a leading edge section of the first cutter 3 in one body. When the holes 51 and 52 illustrated in FIG. 7(a) are formed using the drill 1, the rotating drill 1 is contacted to one face of the lumber from side-ward under a condition that the second cutter 4 having a sphere shape is positioned at a predetermined depth position, the rotating drill 1 is moved straightway until the drill 1 passes through the lumber 41, so that the holes 51 and 52 are formed simultaneously to one another.

When the holes 51' and 52' illustrated in FIG. 7(c) are to be formed, it is sufficient that the drill 1 is moved until it reaches a central predetermined position of the lumber 41. When the holes 51' and 52' illustrated in FIG. 7(b) are to be formed, the first hole 51' and a partial portion of the second hole 52' are simultaneously formed to a predetermined central position of the lumber 41, thereafter the second hole 52 is entirely formed using an ordinary drill so that only the second hole 52 becomes a through hole of the lumber 41.

As is described earlier, the metal device according to claim 1 can joint wooden members (lumbers) to one another which are constructed on a foundation (base). The metal device according to claim 2 can joint a second lumber in a vertical and horizontal direction to a first lumber (beam and the like) which lays in a horizontal direction. The metal device according to claim 2 also can joint a second lumber in a vertical and horizontal direction to an uppermost edge section of a first lumber (column and the like) which stands in a vertical direction. The metal device according to claim 2 can be used as well as the metal device according to claim 1. According to the metal device according to the present invention, the arrangement thereof is simplified in comparison to a conventional metal device illustrated in FIG. 9. The metal device according to the present invention is formed monoblock by pouring melted metal into a molding box, so that welding of members is not needed at all, therefore the manufacturing cost is reduced. Further, it is sufficient that holes for inserting the metal device have a simple shape for inserting a cylindrical section and a flat plate section, so that the hole forming operation becomes simple and the required time for forming a hole becomes shorter.

A jointing method according to claim 3 uses the metal device according to claim 1, while a jointing method according to claim 4 uses the metal device according to claim 2. When one of the jointing methods according to the present invention is employed, a metal device which has a simple arrangement and a low cost is used and a hole forming operation is simple, so that a jointing operation is performed rapidly and easily in comparison to a jointing operation using a conventional metal device.

When a cutting method according to claim 5 is employed, holes for inserting a cylindrical section and a partial portion of a flat plate section which is connected to the cylindrical section are formed at once so that simplification and shortening of the time of the hole forming operation are realized.

What is claimed is:

1. A special jointing metal device for advanced framework construction, which joints wooden members to one another by inserting the special jointing metal device into holes provided in the wooden members, said special jointing metal device comprising:
    a flat plate section, having a rectangular shape with a top edge, a bottom edge, and two side edges;
    a cylindrical section, which is connected to said flat plate section along a first side edge of said flat plate section;
    a U-shape cut away section which is formed by cutting away a portion of said flat plate section from the top edge of said flat plate section; and
    a hole which is provided below said U-shape cut away section and between the U-shape cut away section and said bottom edge of said flat plate section.

2. The special jointing metal device according to claim 1, further comprising:
    a cut away section on a bottom edge of said cylindrical section, capable of receiving a thin edge of a wedge.

3. A method for jointing wooden members to one another, using the special jointing metal device for advanced framework construction according to claim 1, comprising:
    forming first holes in communication with one another in one of said wooden members, in which one of said first holes is substantially cylindrical in form, and capable of receiving the cylindrical section of the metal device according to claim 1, and another of said first holes is substantially rectangular in form, and capable of receiving a partial portion of the flat plate section of said metal device which is connected to said cylindrical section to be inserted;
    forming a through hole in the other wooden member which through hole is substantially rectangular in form, and capable of receiving a partial portion of said flat plate section, in which a remaining portion of said flat plate section is to be inserted;
    inserting a corresponding portion of said metal device in said first holes of said one of said wooden members so that said remaining portion of said flat plate section is projected therefrom;

inserting said remaining portion of said flat plate section in said through hole of said other wooden member;

inserting a first rod member through said U-shape cut away section of said metal device which first rod member is provided at a corresponding position of said other wooden member;

inserting a second rod member in said through hole of said other wooden member and said hole of said metal device.

4. A cutting method for a special jointing metal device for advanced framework construction, which cutting method forms holes in a wooden member simultaneously, in which holes a cylindrical section of a metal device according to claim 1 and a partial portion of a flat plate section of said metal device are to be inserted, which partial portion is connected to said cylindrical section, said cutting method comprising:

employing a drill including a first cutter having a cylindrical rod shape and a second cutter having a sphere shape, which first cutter has first cutting blades elongating in a longitudinal direction, which second cutter is provided in one body at a leading section of said first cutter and has second cutting blades elongating in radial directions;

contacting said drill to one face of said wooden member from the side and along a face of the wooden member intended to be drilled, so that said second cutter is positioned at a predetermined depth position;

rotating said drill; and moving said drill in said rotating condition in a depth direction to a predetermined depth so as to form a hole.

* * * * *